United States Patent [19]
Anderson

[11] Patent Number: 5,285,742
[45] Date of Patent: Feb. 15, 1994

[54] SAIL POWERED VEHICLE

[76] Inventor: Jay A. Anderson, 3344 Edgerton, St. Paul, Minn. 55110

[21] Appl. No.: 702,822

[22] Filed: May 20, 1991

[51] Int. Cl.$^5$ ............................................. B62B 15/00
[52] U.S. Cl. ...................................... 114/43; 114/279;
    114/281; 280/7.12; 280/14.2; 280/213; 280/697
[58] Field of Search ................. 114/43, 279, 281, 61;
    280/7.12, 7.14, 14.2, 28, 28.15, 87.042, 213, 663,
    666, 690, 691, 692, 693, 697, 698, 701, 810

[56] References Cited

U.S. PATENT DOCUMENTS

| | | | |
|---|---|---|---|
| 3,109,665 | 11/1963 | Remmen | 114/43 |
| 3,112,725 | 12/1963 | Malrose | 114/279 |
| 3,203,706 | 8/1965 | Boyden | 280/7.12 |
| 4,027,891 | 6/1977 | Frame | 280/7.14 |
| 4,061,104 | 12/1977 | Rinchot | 114/281 |
| 4,076,267 | 2/1978 | Lipscomb | 280/87.042 |
| 4,114,912 | 9/1978 | Sweeney | 280/28.15 |
| 4,161,323 | 7/1979 | Wetteland | 280/28 |
| 4,200,302 | 4/1980 | de Rosnay | 280/7.12 |
| 4,408,772 | 10/1983 | Hollwarth | 114/43 |
| 4,617,871 | 10/1986 | Yau | 280/810 |
| 4,681,333 | 7/1987 | Rouge et al. | 280/810 |
| 4,740,000 | 4/1988 | Moessner | 280/810 |
| 4,829,925 | 5/1989 | Haanen | 114/283 |
| 5,161,810 | 11/1992 | DeCesare | 280/28 |

FOREIGN PATENT DOCUMENTS 946465 1/1964 United Kingdom ................ 114/279

Primary Examiner—Michael S. Huppert
Assistant Examiner—Thomas J. Brahan
Attorney, Agent, or Firm—Douglas L. Tschida

[57] ABSTRACT

A wind powered vehicle including an operator platform having tilting and stationary sections coupled together via a plurality of hanger bearings and a longitudinal pivot axle. The platform section tilts with foot pressure applied at a stirrup to direct a forward steering assembly. The stationary platform section includes a resilient suspension and supports an opposite foot of the operator. The forward steering assembly provides a tilting, center biased steering turntable and axle. Adjustable axle bearing collar support and shock absorbers support forward and aft pairs of skis, wheels or runners which are tilted at opposite caster angles. The steering assembly, hanger bearings, cable truss supports and a sail coupler are each longitudinally adjustable along the length of the platform. In alternative configurations, wheels are mounted to the fore and aft axles; the platform includes spray guards; or the vehicle is constructed with water skis and the platform is constructed to provide flotation.

20 Claims, 8 Drawing Sheets

SAIL POWERED VEHICLE

BACKGROUND OF THE INVENTION

The present invention relates to land based, sail or wind powered vehicles and, in particular, to a vehicle which is adaptable for use with bladed runners, skis or wheels.

As leisure time has increased and individuals have become more concerned with personal health, involvement in traditional athletic activities and sports such as skiing has increased. A number of other sports have also been invented, such as skateboarding and sailboarding, to accommodate the increasing demand.

A hybrid of the latter two sports utilizes a sail powered skateboard and has found a following in locations having large expanses of sand beaches. Those vehicles generally provide a molded platform which supports an upright operator and sail. Steering is typically achieved through control of pairs of conventional skateboard wheel suspensions which include elastomer pads placed between the wheel brackets and board.

Another activity of which applicant is aware having some similarities to the present invention is the sport of ice boating. This activity, however, requires a rather elaborate assembly. Typically, an enclosed platform is provided which supports a seated operator relative to appended runners or wheels. Cable steering linkages coupled between the platform and a main mast/boom direct a sail and the bladed runners. Iceboard constructions accommodating a standing operator are shown at articles appearing at pp. 38-43 of Windsurf magazine (November, 1988). References can also be found at pp. 259-260 of Windsurfing--The Complete Guide by G. Taylor (McGraw-Hill Paperbacks, Revised Ed, 1979) to another iceboard construction and a hydrofoil construction.

To the extent Applicant is aware of other assemblies having some similarities to the present invention, U.S. Pat. No. 4,076,267 discloses a skateboard assembly which provides fore an aft wheeled axles that are directable via separate tilting platform sections which respond to the tilting motion. U.S. Pat. No. 4,202,559 discloses a skateboard including a platform which provides a static rear axle and a rotatable forward platform section which directs a pair of steering wheels.

U.S. Pat. Nos. 4,049,287 and 4,408,772 disclose assemblies resembling iceboats, whereby a seated operator manipulates a sail and foot or seat controlled steering linkages to direct the vehicle.

U.S. Pat. Nos. 4,200,302; 4,617,871 and 4,740,000 disclose assemblies which support a sail and an upright operator who steers the assembly via a castered linkage. The U.S. Pat. No. 4,740,000 patent particularly discloses a stirrup containing platform. Steering is effected via a longitudinal axle coupled to the platform and fore and aft tie-rod steering linkages which are rigidly coupled to a lengthwise axle.

The present invention in contrast to the foregoing, provides an assembly having a long, stable platform which steers much like a sailboard or from the aft end of the assembly. One foot is supported at a static resiliently biased rail or platform while a second, stirrup contained foot pivots a forward platform which, in turn, is coupled to a roller bearing, turntable assembly. Forward and aft pairs of skis, wheels or runners are mounted at offsetting positive and negative caster angles to effect controlled steering at speeds in excess of 50 miles per hour.

SUMMARY OF THE INVENTION

It is accordingly a primary object of the present invention to provide a wind powered assembly wherein a sail is controlled by an upright operator and steering is effected through appropriate foot movements.

It is a further object of the invention to provide an assembly which provides an adjustable mounting of the sail and steering linkages along the platform.

It is a further object of the invention to provide an assembly which is adaptable for use with varieties of land surfaces, such as ice, snow, sand or hard packed ground.

It is a further object of the invention to provide an assembly wherein the terrain contacting supports (i.e. skis, wheels or bladed runners) are mounted at opposite positive and negative caster angles at respective fore and aft platform ends for providing maximum steering control at relatively high speeds.

It is a further object of the invention to support each ski or wheel axle at an adjustable bearing collar support.

It is a still further object of the invention to provide an operator support platform having a stationary or static section that supports close-reach, beam-reach and broad-reach sailing positions relative to a pivoting, foot controlled forward portion.

It is a further object of the invention to provide a floating longitudinal, platform pivot axle.

It is a further object of the invention to provide mechanisms for biasing the steering linkage and tilting platform section to a neutral, straight-ahead condition.

It is a further object of the invention to provide a static platform section which is resiliently supported via a sway bar, a plurality of shock absorbers and springs or alternatively a torsion bar.

It is a further object of the invention to provide a forward steering assembly including an inclined, bearing supported turntable and axle which axle tilts as it rotates to manipulate skis or wheels positioned at equal positive caster angles.

It is a still further object of the invention to provide and assembly which is readily assembled and dismantled for use, repair, component substitution and/or transport and which is configured from readily available parts.

Various of the foregoing objects, advantages and distinctions of the invention are particularly achieved in a number of presently preferred constructions which are described below with respect to the appended drawings. In a first assembly, fore and aft pairs of skis are mounted at opposite positive and negative caster angles to support an operator platform and appended sail. An aft, rail constructed, static section of the platform supports one foot of the operator and a stirrup contains the other foot to a forward pivoting platform section. A tilted, O'ring sealed roller bearing turntable directs a live or forward axle with a pivoting of the forward platform section. Resilient suspensions stabilize the static platform section and each ski. In one alternative configuration, resiliently biased wheels support the assembly. In a third alternative construction, a ski containing hydrofoil construction of the assembly is disclosed.

Still other objects advantages and distinctions of the invention will become more apparent from the following detailed description with respect to the appended drawings. Various considered modifications and improvements thereto are also described in relation to the various alternative assemblies. The following description is intended to be illustrative only of considered constructions and should be not be interpreted in limitation of the invention. Rather, the invention should be interpreted within the spirit of the following claims.

DESCRIPTION OF THE PREFERRED EMBODIMENT

Figure 1:
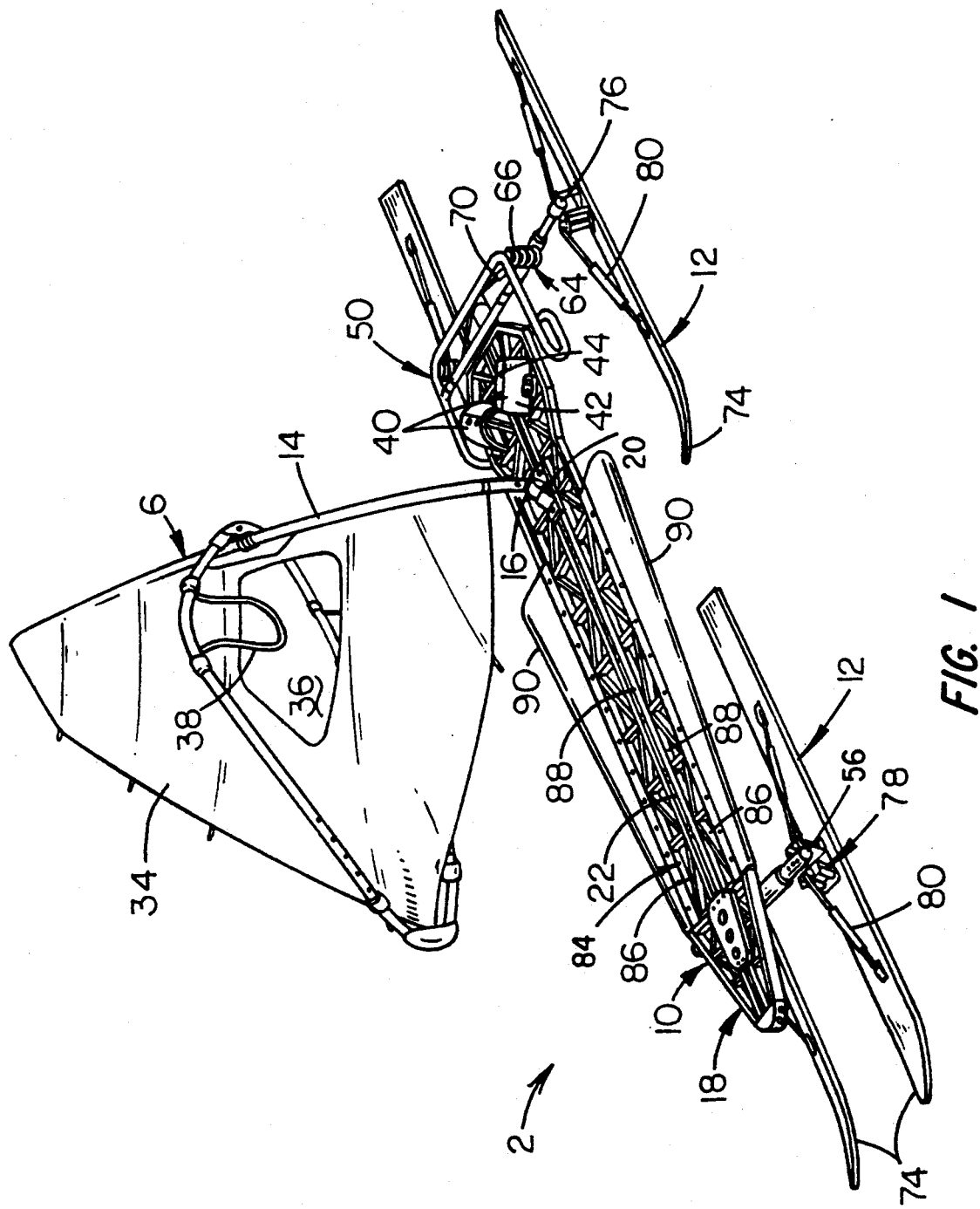
FIG. 1 is a perspective drawing of a snow ski construction of the invention.
Figure 2:
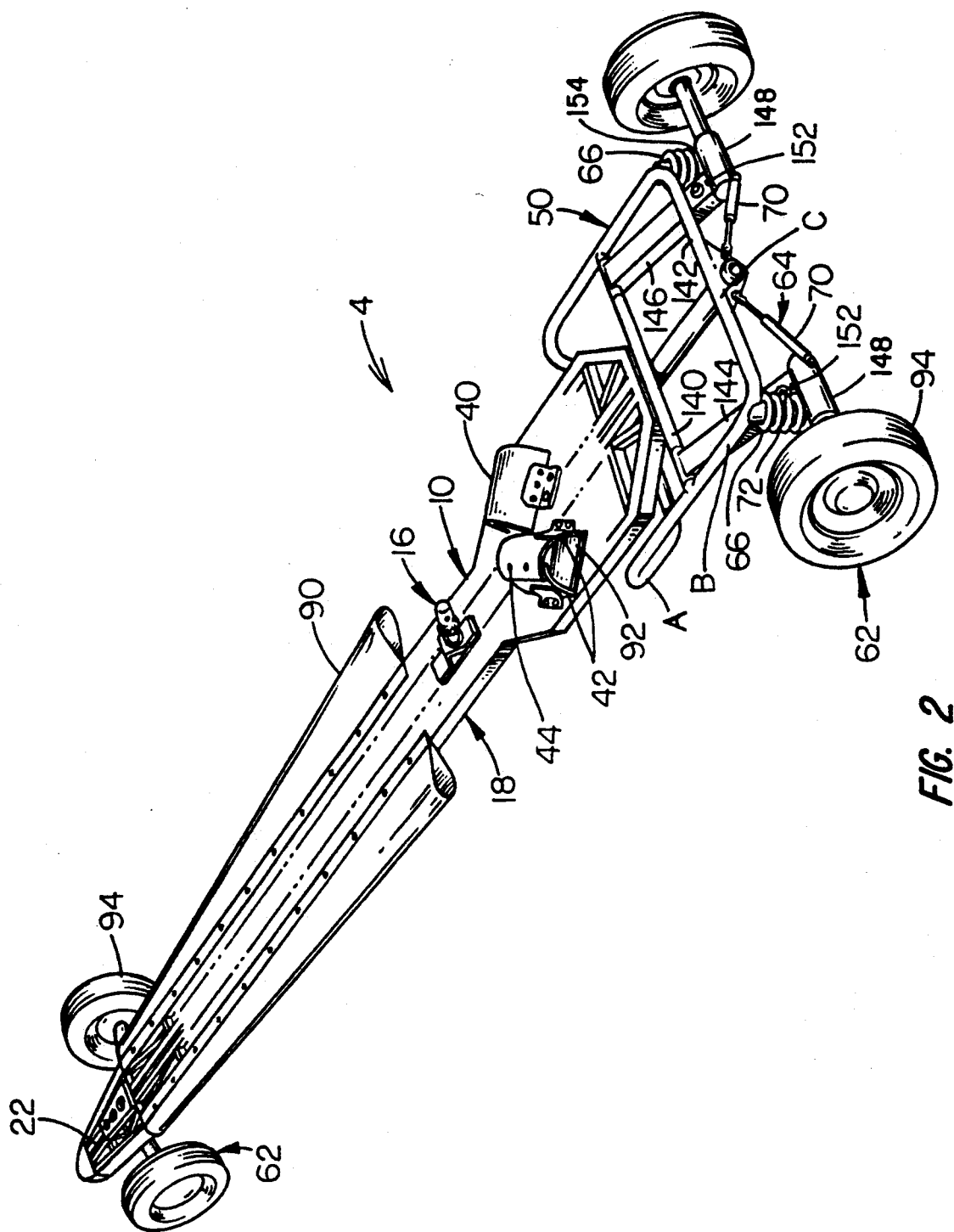
FIG. 2 is a perspective drawing of a balloon tired construction of the assembly.
Figure 3:
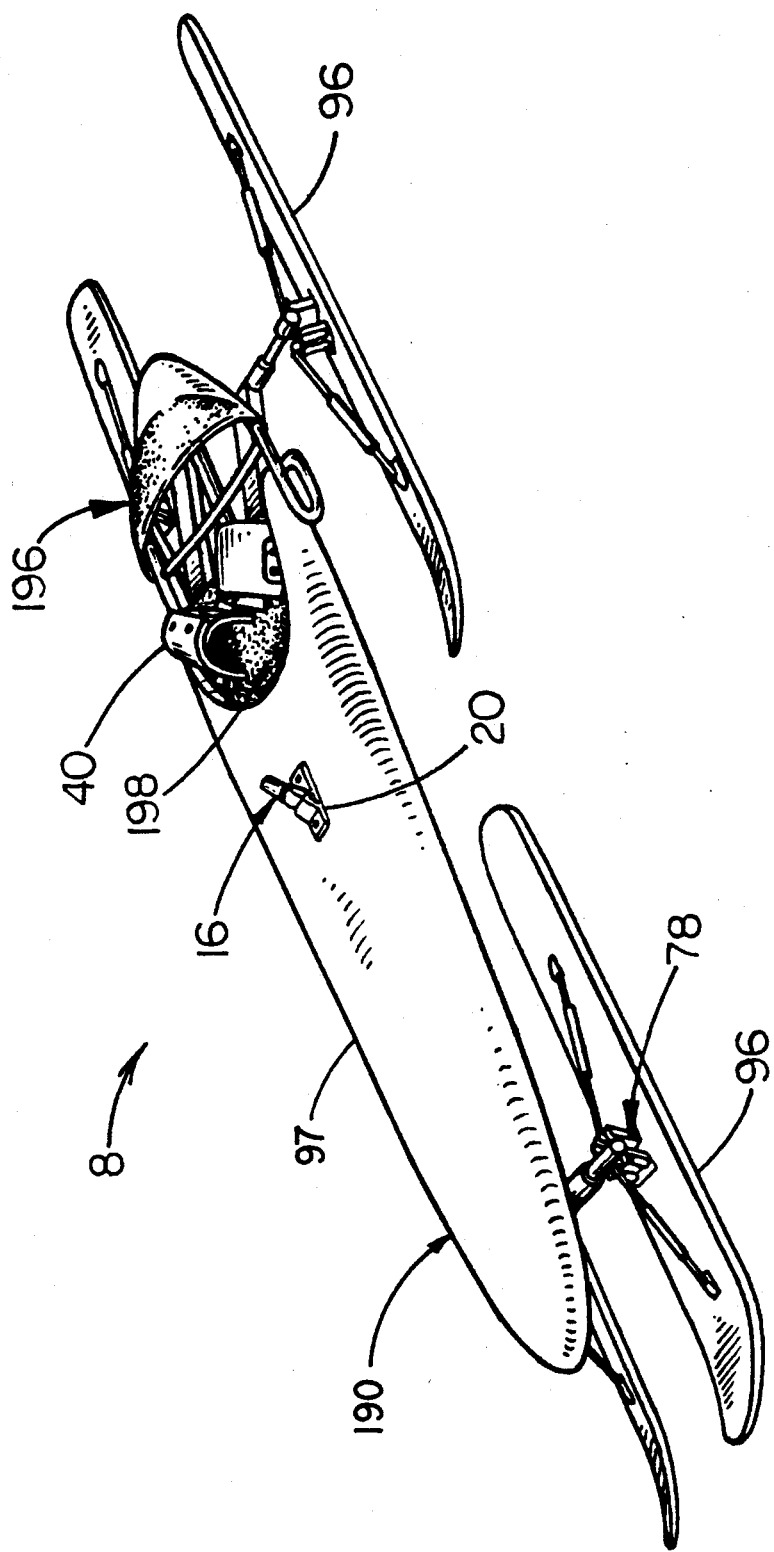
FIG. 3 is a perspective drawing of a water ski or hydrofoil construction of the invention.

Referring to FIGS. 1, 2 and 3, perspective drawings are shown of alternative constructions of a sail powered vehicle of the invention. FIG. 1 depicts an assembly 2 which is configured for use on snow or icy surfaces such as frozen, snow covered lakes or fields. FIG. 2 depicts an assembly 4, less the sail assembly 6, which finds application for use over sandy beaches or other hard packed ground. FIG. 3 depicts an assembly 8, less the sail assembly 6, which floats and operates like a hydrofoil for use on water.

Depending upon the time of year or locale where the operator/owner resides, the sail powered vehicle of the present invention is usable on a variety of surfaces and terrains throughout the seasons of the year. Through the judicious use of common components, and with the exception of the assembly 8, the assemblies 2 and 4 are modifiable with the substitution of a minimal number of subassemblies to become compatible with the terrain. That is, wheels, skis or bladed runners (not shown) can be substituted interchangeably.

Depending, too, upon the configuration of the vehicle, the operator typically dons appropriate padded clothing, knee and elbow pads, head gear and other accessories to insure personal safety, in the event of a mishap. Such clothing is especially important since the present vehicle is operable at relatively high speeds.

In contrast to various of the located and above-referenced art, the assemblies 2, 4 and 8 provide a relatively long support framework 10 (i.e. eight feet) and one which also has a relatively wide base (i.e. two to three feet). A stable operator support platform 10 is thereby obtained for the typical speeds which can be achieved. The particular speed depends on the skill of the operator, the positioning of the sail relative to the wind, and the wind speed, among many factors. For the assembly of FIG. 1, however, speeds in the range of 50 to 60 miles an hour have been obtained under wind conditions of approximately 30 miles per hour.

Appreciating that the chassis or framework of the alternative assemblies 2, 4 and 8 shown in FIGS. 1–3 is essentially the same, the framework construction is described below with respect to the assembly of FIGS. 1 and the associated subassemblies shown in FIGS. 4–7. Distinguishable subassemblies peculiar to the assembly 8 at FIG. 3 are described with respect to FIG. 8.

Referring to FIG. 1, the sail powered vehicle 2 is generally comprised of the sail assembly 6, the platform 10 and a plurality of ski assemblies 12. The sail assembly 6 provides a lightweight portable mast 14 and hand boom such as are commonly used with sailboards on the ocean or inland lakes. The mast 14 is secured to the platform 10 at a coupler 16. The coupler 16 is of a conventional construction and permits multi-axial positioning of the sail 6. The coupler 16 projects from the multisection operator platform 10 at an inclined or canted mounting plate 20 (reference FIG. 7).

Whereas water type sailboards provide a coupler 16 which is supported from the flat surface of a one-piece board, the present vehicles 2, 4 and 8 use an inclined mounting plate 20 and to which a conventional coupler 16 is fastened. The plate is canted approximately 35 degrees, which facilitates attachment of the coupler 16. The mounting position of the plate 20 is adjustable along the length of the platform 10 at a provided center slot 22. A number of through fasteners 112 and a bottom clamp plate 23 retain the coupler 16 to the platform 10. The specific details of the adjustable sail mounting are more apparent from FIG. 7 and will be discussed below.

Figure 7:
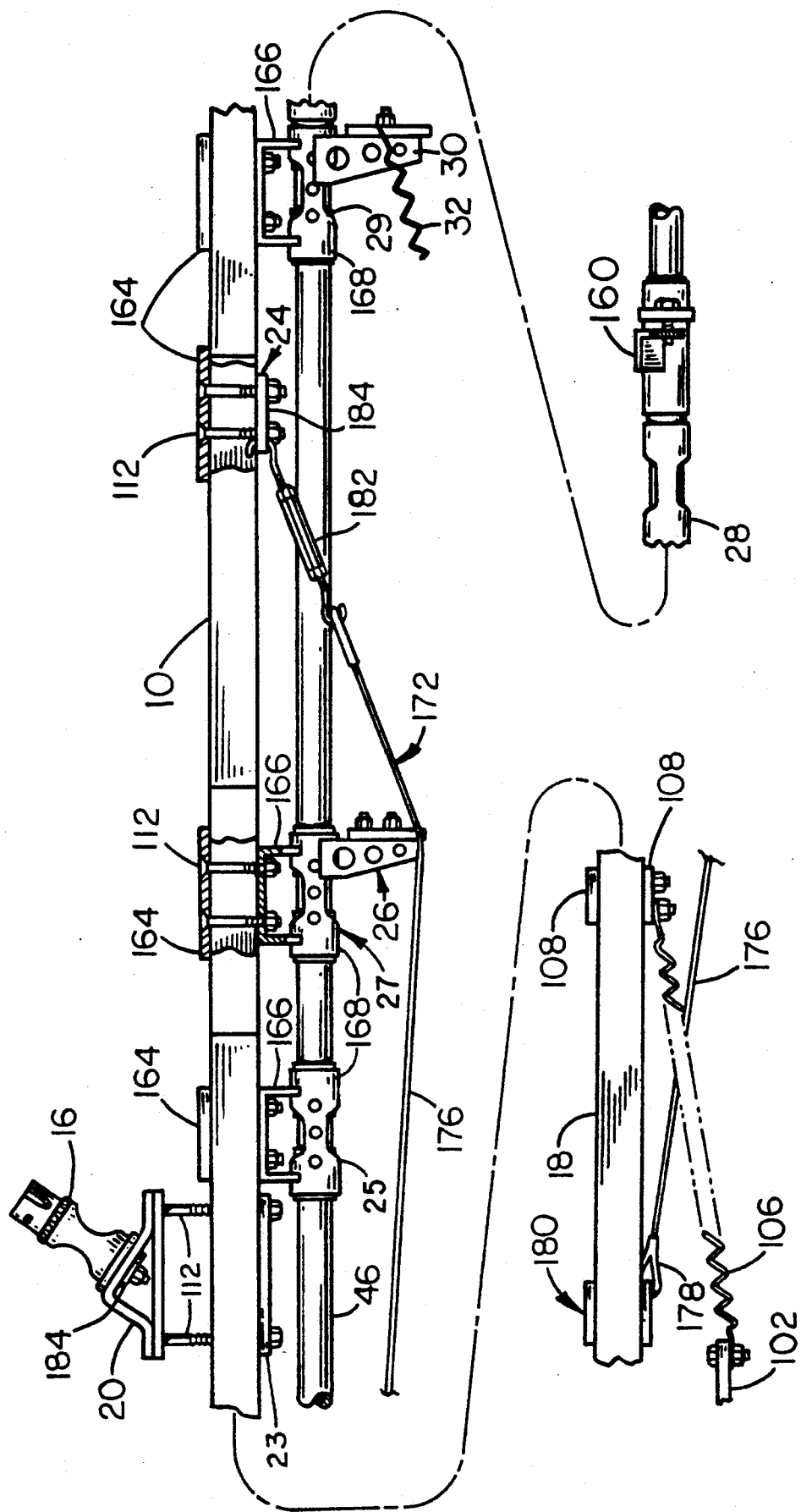
FIG. 7 is a side elevation drawing of the forward pivoting platform depicting the adjustable axle support bearings, sail coupler, cable truss supports, return-to-neutral springs and platform stops.

Also apparent from FIG. 7 are the adjustable nature of an aft cable anchor plate 24, a cable truss support or hanger bracket 26 and a pair of cables 172 which stabilize the platform 10, hanger bearings 25, 27, 28 and 29 support a platform pivot axle 46. A hanger bracket 30 contains a number of coiled springs 32 which bias the platform 10 to a neutral, center position. Each of the foregoing assemblies are re-positionable along the center slot 22 to facilitate the fitting of the vehicle to the operator.

Secured to the mast 14 is the sail 34 which is constructed of a lightweight, weather and ultraviolet resistant material. The sail 34 is sewn to a conventional configuration and includes a transparent window 36, whereby the operator can see through the sail 34 during sailing maneuvers. Encircling the sail 34 and projecting at right angles to the mast 14 is a hand boom 16. The boom 16 provides a cushioned hand rail surface, whereby the operator counterbalances the force of the wind against the sail by pulling the sail toward the operator. A strap or operator harness 38 facilitates balancing and permits a greater degree of operator freedom to displace his/her weight relative to the sail assembly 6.

The operator otherwise stands upright on the platform 10 with a forward foot positioned within one of a pair of provided stirrups 40. The stirrups 40 are constructed of a molded rubber or other plastic material and are shaped to readily receive one of the operator's feet without requiring the binding of the foot to the stirrup. The foot opening is adjustable by re-positioning overlapping straps 42 and reattaching sear fasteners 44. During normal use, the operator maneuvers about the platform 10 at appropriate times to position the appropriate foot within one or the other of the stirrups 40 relative to the desired direction of travel and wind condition.

Figure 6:
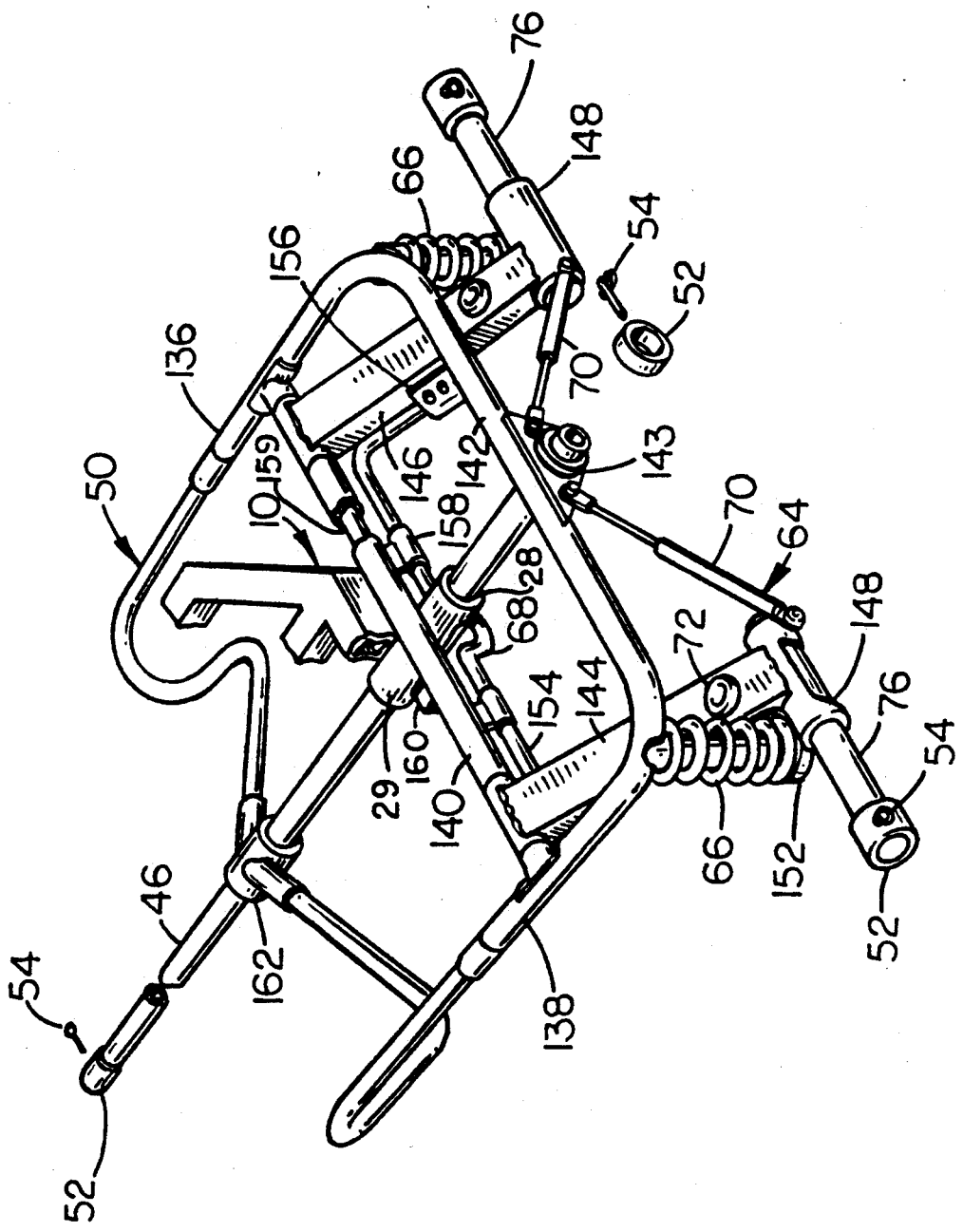
FIG. 6 is a perspective drawing shown in partial cutaway of the static platform portion and suspension assembly, wherein alternative sway bar and torsion bar configurations are shown.

The forward foot particularly controls rotation of a forward platform section 18 via the longitudinal pivot axle 46 (reference FIGS. 6 and 7). The axle 46 is suspended within the hanger bearings 25, 27, 28 and 29 and an aft platform section 50. The platform pivot axle 46 is restrained at its opposite ends via end collars or retainers 52 and detent-type pull lynch pins 54 which fit through each retainer 52 and the axle 46. The axle 46 is thus free to rotate within the hanger bearings. Surface wear is thereby minimized along the length of the axle.

A live forward axle 56 is coupled to a canted forward steering assembly 60. The assembly 60 responds to the pivoting of the forward platform section 18 to convert vertical rotation of the platform section 18 to a horizontal rotation and appropriately direct the skis 12 or wheels 62 (reference FIG. 2). The particular details and operation of the steering assembly 60 are described below with respect to FIG. 4.

While the forward foot of the operator primarily controls vehicle steering, the aft foot is positioned on a stationary platform section 50 which partially surrounds the aft end of the platform section 18. The particular positioning of the foot permits conventional control over the sail for the close-reach, beam-reach and broad-reach positions generally depicted at the reference callouts A, B, and C.

The platform section 50 is configured as a railed frame and is formed from a tubular stock which exhibits sufficient wall strength to withstand nominal dynamic forces from an operator weighing up to 275 pounds. The framework of the platform section 50 is constructed from tubular steel pipe stock $\frac{7}{8}$ to $1\frac{3}{8}$ inch diameter and having a 0.058 inch wall thickness. It is to be appreciated that a variety of other dimensions and material types of tube stock may be used.

A resilient suspension system 64 includes a pair of coil springs 66, a sway bar 68, shock absorbers 70, and a pair of cushion bumpers 72. The suspension 64 stabilizes the platform section 50 to provide a relatively stationary surface with vehicle movement. The details of the suspension assembly 64 are particularly described below with respect to FIG. 6.

Detachably secured to the forward live axle 56 via a number of the lynch pins 54 are a pair of resiliently supported snow ski assemblies 12. Each ski assembly 12 includes a ski 74 of conventional construction which is provided with metal edges and is typically on the order of 100 to 220 cm long. A second pair of skis 74 are mounted to aft stub axles 76 which extend from the platform section 50. The length and/or width of the aft skis 74 may be increased over the forward skis 74, depending upon operator preference and/or for purposes of varying the operating characteristics of the forward and stationary platform sections 18, 50.

Each ski 74 is secured to the vehicle 2 at the ends of the axles 56, 76 with an adjustable axle bearing assembly 78. Each assembly 78 is rigidly attached to the ski and detachably secured to the axle end. The details of the axle bearing assemblies 78 are described below with respect to FIG. 5. Generally, each bearing assembly 78 affords an adjustment range from +45 to −45 degrees for each ski 74. The forward skis 74 are each adjusted to a positive caster angle, whereby the outer lateral edges of the ski are canted to engage the snow or ice. The aft skis 74 are canted to an opposite, negative caster angle, whereby the inner edges of the skis 74 engage the snow or ice. The magnitude of the caster angle is the same for each pair of skis but can be varied between the front and rear ski pairs.

It is also to be appreciated that the cant angle of the forward skis 74 relative to the cant angle of the steering assembly 60 is at a maximum for the straight-ahead position. Otherwise during turning and with the rotation of the steering assembly 60 and the live axle 56, the caster angle diminishes at the forward skis 74. The forward skis 74 are effectively flat to the land or water at a maximum turn angle, which requires a turning radius of approximately thirty-five feet.

Although the caster angle of the forward skis 74 varies with ski position, the caster angle of the aft skis 74 remains constant. The assembly 2 is thereby stabilized through turns, since the sharp edges of the skis 74 carve into the terrain to prevent lateral slippage. In a similar fashion, the treads of the tires for the vehicle of FIG. 2 maintains ground contact through a turn.

Projecting forward and aft from each axle bearing 78 are pairs of pneumatic or gas powered shock absorbers 80 which stabilize the skis 74 from normally encountered flexion and vibration. Each axle bearing 78 is particularly secured to the ski 74 at a relatively long platform member 82 (reference FIG. 5). The skis 74 are thus able to flex with movement without inducing strain at a concentrated point. Ski life is thereby improved. A more stable and controlled ride is also obtained, with the skis 74 maintaining stable contact to the ground, which is critical during turns, rather than jumping or chattering up and down. The vehicle speed is also typically reduced during turns, and all things considered, the present steering assembly 60 and caster angle arrangement of the skis or wheels have performed satisfactorily.

The forward platform section 18 is constructed from one bye half inch rectangular I.D. steel or aluminum tube stock. The tube stock is welded to provide a number of cross braced sections 84 of approximately one-half foot length which are replicated over the nominal eight foot length of the forward platform section 18. Each section 84 includes a pair of cantilever members 86 of alternating angular orientation relative to a pair of center longitudinal rails 88. The spacing between the rails 88 defines the slide channel 22 which receives the fasteners used to secure the steering assembly 60, hanger bearings 25, 27, 28, 29, cable anchor 24, etc.

Projecting in a longitudinally tapered orientation from the lateral sides of the platform section 18 are a pair of formed resilient plastic splash guards 90. Such guards are configured of a plastic sheet stock material which is suitably shaped and fastened to the framework with rivet fasteners or the like. The guards 90 deflect surface water, loose snow, etc. away from the operator, which may spray upward as the vehicle 2 travels over the ice and act much like fenders on a trailer. The guards 90 may also be configured to a variety of shapes.

Although, too, the frameworks of the platform sections 18 and 50 are shown, it is to be appreciated that a variety of skin coverings can be mounted over the frameworks. Such coverings would commonly be constructed from fiberglass or other resilient material. Non-slip pads or grip improving surfaces can be provided to facilitate maneuvering. The area surrounding the stirrups 40 and the aft platform section 50 are typically covered with a high friction material relative to the operator footwear. Wedge shaped foot pads 92 (reference FIG. 2) having a granular surface are also typically included at the stirrups 40.

FIG. 2, as mentioned, discloses a wheeled vehicle. Where the vehicle 2 of FIG. 1 requires axle bearings 78 at each of the skis 74, the hub of each wheel 62 for the vehicle of FIG. 2 is sized to mate directly with the axles 56, 76. Suitable roller bearings are provided at each wheel 62 to minimize friction. Mounted to each wheel 62 is a pneumatic or a balloon tire 94 which has an appropriate tread surface for the preferred terrain. The caster angle condition of the forward and aft wheels are opposite to one another, as adjusted by assemblies described below.

FIG. 3 depicts an aquatic vehicle construction 8, similar to the vehicle 2. The principal distinctions are that water skis 96 have been substituted for snow skis and the platform 190 is configured for flotation. The metal platform framework otherwise is replaced with a covered foam which is more tolerant of the water environment. T-shaped slide tracks 192 and full length splines 194 (reference FIG. 8) are bonded into the platform to permit adjustments and strengthen the forward platform section 97.

Figure 4:
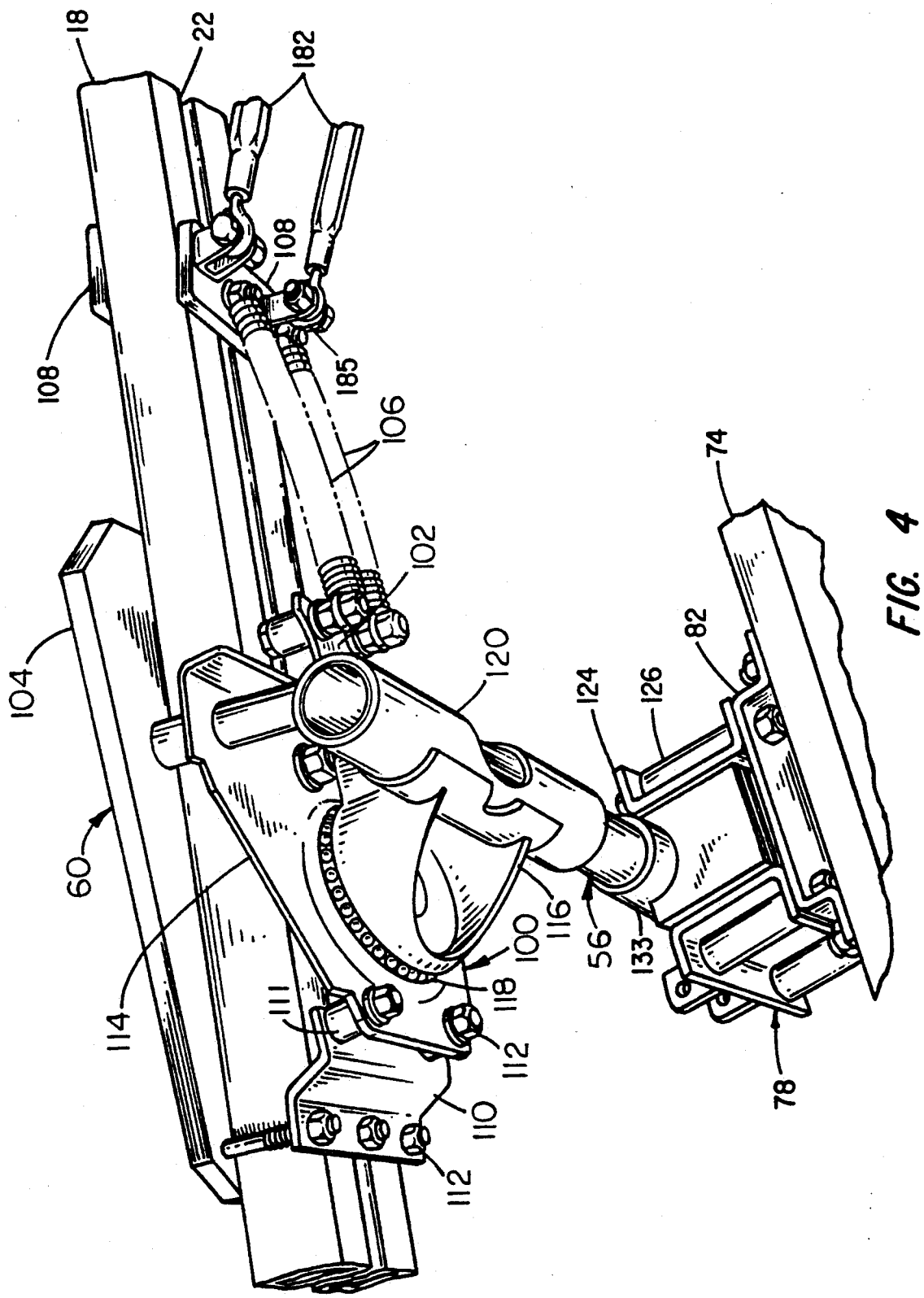
FIG. 4 is a perspective drawing of the forward steering assembly and a portion of one of the axle support blocks.

Directing attention next to FIG. 4, a detailed perspective drawing is shown of the forward steering assembly 60. The assembly 60 includes a turntable assembly 100 which is coupled to the forward axle 56. A tailpiece 102 of the turntable 100 extends beneath the platform section 18 and parallel to a fastener or clamp plate 104 secured to the upper platform surface. The tailpiece 102 supports a pair of springs 106 which bias the assembly 60 to a neutral or straight ahead condition. The springs 106 are anchored to the platform 18 at a pair of anchor plates 108 (see also FIG. 7). Similar springs 32 mount to the aft end of the platform section 18 at the hanger bracket 30. As the turntable 100 rotates, the springs 106 bias the assembly 60 to prevent inadvertent oversteering. Depending upon the desires of the operator, springs 106 and 32 of greater or lesser bias pressures can be used to vary the foot pressure required to steer the assembly 2.

The turntable assembly 60 is canted or inclined from the plane of the platform section 18 approximately 15 degrees via a forward offset plate 110. The plate 110 particularly positions the turntable 100 at a cant angle in the range of 10-20 degrees to the platform 10. Sleeve spacers and/or shims 111 are also provided to facilitate tuning of the cant angle and vehicle steering. Each of the plates 104, 108 and 110 are secured to each other and the center channel 22 via a plurality of through bolt fasteners 112. Wherever the threaded fasteners 112 are used, it is to be appreciated an allen type, torx head, grade 8 bolt fastener and nylon lock nuts are preferred.

Mounted to the plate 110 is the turntable assembly 100. The turntable 100 provides upper and lower mating collars 114, 116 which rotate relative to one another along a plurality of roller bearings 118. Depending upon the terrain, the bearings 118 may be sealed beneath an appropriate sealed cover or boot (not shown). The turntable 100 is secured to the plate 110, clamp plate 104, and platform section with a number of other bolt fasteners 112. Mounted to the lower extremities of the collar 116 is a hanger bearing 120 which supports the live axle 56.

Steering of the vehicle 2 is thus effected by applying foot pressure to the platform section 18 to pivot the platform section about the longitudinal axle 46. As the platform section rotates, a corresponding horizontal rotation is induced at the turntable 100 due to the canting of the turntable. The forward skis 74 are, in turn, directed via the live axle 56 from the center or neutral position, to track to one side or the other. As the turntable 100 rotates, the axle 56 cants in an opposite direction to the caster angle of the forward skis 74 such that as the skis 74 or wheels 62 follow the rotation of the axle 56, the effective incline of the axle 56 decreases, as well as the edge contact between the skis or wheels with the snow or ground. At maximum rotation, the vertical axis through the skis 74 or wheels 62 is perpendicular to the ground surface. Stated differently, a zero caster angle is normally presented and the skis or wheels are flat to the ground at a maximum rotation of the assembly 60. At this point, instead of sliding, the oppositely directed caster angle of the aft skis or wheels holds the vehicle to the line of the turn determined by the assembly 60. Depending, too, upon the vehicle speed, care is normally taken during turning and the turning radius is incrementally adjusted to compensate for slight sliding or slippage due to the reduced edge contact between the forward skis or wheels. The relative caster angles of the axle bearings 78 may also be adjusted as desired to provide a tailored steering characteristic.

The steering properties of the vehicles 2, 4 or 8 may be partially altered by varying the position of the sail and/or steering assembly 60 relative to the operator. That is, the steering assembly 60 can be longitudinally shifted fore or aft relative to the operator. Similarly the position of the sail 6 can be longitudinally adjusted along the platform section 18. Any established mounting positions must take into account the physical size of the operator; the convenience and/or difficulty in manipulating the sail 6; the length of the skis 74, the ski caster angle, among other factors.

Figure 5:
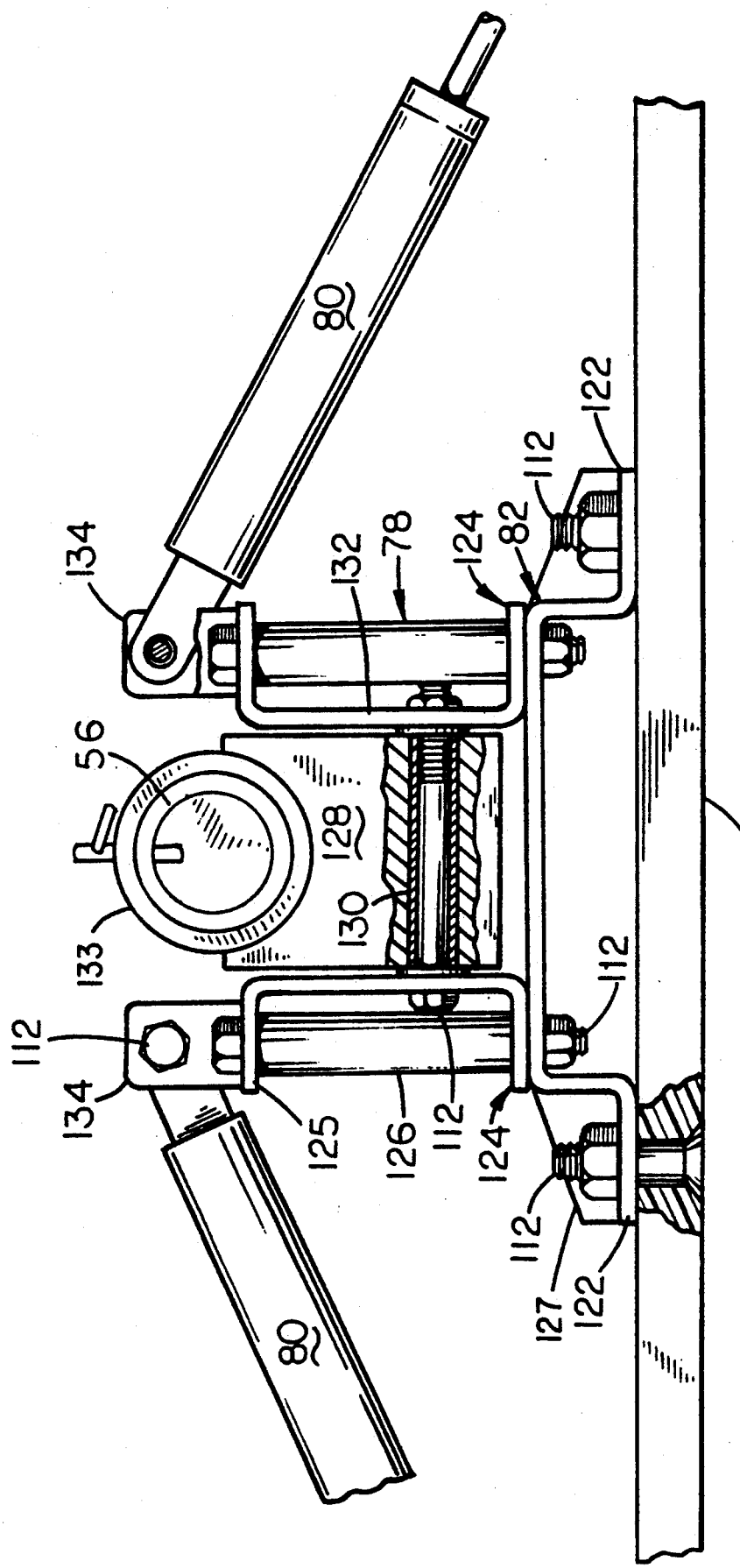
FIG. 5 is a side elevation drawing of an axle block.

With additional attention to FIG. 5, a detailed elevation drawing is shown of one of the axle bearing assemblies 78 in association with the forward live axle 56, a portion of a ski 74 and the pneumatic struts 80 which stabilize the ski 74 to the axle bearing 78. Although a single axle bearing assembly 78 is shown, it is to be appreciated that identical assemblies 78 are provided at each of the fore and aft skis 74.

Each axle bearing assembly 78 is generally comprised of an inverted U-shaped base or platform member 82 which includes a pair of end flanges 122 whereat bolt/nut fasteners 112 secure the base 82 to the ski 74. The base 82 spans approximately 6 to 8 inches of the ski surface. A void is provided between the flanges 122 to permit the flexing of the ski over as wide a region as possible. This prevents repeated stressing of the ski 74 at the attachment points and potential fracturing or splintering.

Appended to the upper surface of the base 82 are a pair of C-shaped channels 124. Flanges 125 of the channels are secured to the base 82 with pairs of bolt fasteners 112 and sleeve spacers 126 which mount about the bolts to maintain the channel space between the flanges 125. The sleeves 126 also add rigidity to the channels 124. Alternatively, a more rigid channel stock might be used, but which tends to add weight to the assembly 78. A welded coupling with appropriate gussets, such as the gussets 127 at the base support 82, might also be used, but for the typically encountered stresses and load conditions, welds have a tendency to fail.

Mounted between the channels 124 is a caster angle adjustment block 128. A pair of longitudinal sleeved bores 130 (only one of which is shown) extend through the block 128 and align with mating bores provided in the webb 132 of the channels 124. Presently, a single through bolt fastener 112 is provided which serves as a pinch bolt to establish a desired caster angle condition for the supported ski 74 or wheel 62. Although a single through bolt 112 secures the angle of the ski, the bore provided for the second fastener may be shaped to exhibit a slotted channel through the axle block or may comprise multiple bores to accommodate the adjustment range of the axle block and further stabilize an established caster angle.

A tubular sleeve weldment 133 is secured to the upper surface of the axle block 128 and receives one end of the live axle 56. A number of holes are bored in the axle 56 and sleeve 133 to receive a plurality of lynch pins 54 to redundantly secure the axle 56 to the axle bearing assembly 78; yet permit easy removal Also secured to the upper flanges 125 of the channels 124 are a pair of U-shaped brackets 134. The brackets 134 retain one end of the struts 80. The opposite end of each strut 80 is secured to a second U-shaped bracket 134 that is spaced along the ski 74. Presently, struts which are 20 to 24 inches long are provided at each axle bearing assembly 78 and radiate toward the forward and aft ends of each ski 74. The struts 80 stabilize the ski 74 to maintain edge contact without undue flexion of the ski at the typical operating speeds.

Referring to FIG. 6, a detailed perspective drawing is shown of the framework which forms the stationary platform section 50 and the suspension assembly 64 which is appended between the platform section 50 and the aft skis 74. Also depicted is the longitudinal platform axle 46 which extends from the platform section 50 and a portion of the adjacent movable platform section 18. The framework of the section 50 provides an outer periphery that includes right and left lateral rail portions 136, 138 which extend along the sides of the forward platform section 18 and mate with the hanger bearing 29 beneath the platform section 18. A pair of cross rails 140, 142 extend between the lateral rails 136, 138 aft of the platform section 18. A center portion of the cross rail 140 is secured to the hanger bearing 28 and is rotatively mounted between the lateral rails 136, 138. Welded to the outer ends of the center portion of the cross rail 140 and depending downward are right and left axle support arms 144, 146. Secured to the ends of the support arms are bearing collars 148 which support the stub axles 76. The stub axles 76 mount to the sleeves 133 of the axle bearing assemblies 78 at the aft skis 74 and are retained by end retainers 52 and pins 54. Alternatively, the axles 76 can be pinned to the sleeves 133.

An alternative construction of the above stub axle mounting is provided at wheeled assembly of FIG. 2, an adjustable coupling is provided between the bearing collars 148 and the axle support arms 144, 146. Specifically, a through bolt and pinch clamp assembly 152 are provided which permits an adjustment of the collars 148 to a desired caster angle. Alternatively, a separate adjustable backing plate assembly can be provided with each wheel. Such an assembly would include a fixed stub axle to support the wheel and a cant adjustable clamp coupler that mates with the axles 56, 76. The clamp coupler (not shown) would be adjustable in relation to the backing plate in a fashion similar to the manner in which the clamp assemblies 152 mount to the members 144, 146.

The suspension assembly 64 mounted between the platform section 50 and the skis 74 or wheels 62, otherwise, is comprised of a number of resilient subassemblies which absorb the varieties of forces presented to the skis or wheels with normal vehicle movement. The platform section 50 thereby provides a stable foothold for the operator who, in turn, is able to enjoy the experience and concentrate on vehicle control rather than merely maintaining balance. The motion stresses are particularly absorbed via the coiled springs 66, the pneumatic shock absorbers 70 and the resilient stops or bumpers 72 mentioned previously.

The coil springs 66 particularly extend from the corners of the lateral frame members 136, 138 and the aft cross member 142 and mount to a retainer plate 154 that extends from the inside corner of each axle support arm 144, 146. The springs 66 are sized to each exert a spring force of approximately 200 pounds.

Secured adjacent to each spring and mounted to the lower end of each axle support arm 144, 146 are the rubber bumpers 72. A molded metal insert included with each bumper 72 receives a fastener which secures the bumper to the axle support arm. In normal use, the springs maintain a nominal free space between the bumpers 72 and the framework 50. Under severe shock conditions the bumpers act as resilient stops to prevent the bottoming of the cross member 142 against the stub axles 76. Damage to the framework of the platform section 50 is thereby prevented.

The pair of pneumatic springs or shock absorbers 70, in turn, extend between the inner ends of the stub axles 76 and a gusset flange portion of a hanger bearing 143 which is secured to the cross rail 142. The shock absorbers are approximately 10 to 12 inches in length and absorb approximately 175 pounds of force. The shock absorbers, retain the axle control arms 144, 146 and stabilize the framework from lateral sway and a portion of the encountered vertical forces.

Also secured to the lower surface of the cross rail 140 and passing beneath the axle bearing 29 is a tubular sway bar 154. The sway bar 154 is secured to each of the axle support arms 144, 146 via end brackets 156. Welded clip fasteners 158 contain the center regions of the sway bar 154 to the cross member 140.

In lieu of the springs 66, a torsion bar 159 (shown in the cutaway portion of the cross member 140) can be substituted in conventional fashion. The torsion bar would typically be included with the sway bar 154.

Also to be noted from FIGS. 6 and 7 are a pair of stop weldments 160 which adjustably mount to the hanger bearing 28, forward of the cross rail 140. The stops 160 particularly comprise a pair of L-shaped members which limit rotation of the platform section 18 as it pivots.

Mounted forward of the stops 160 and securing the hanger bearing 29 to the platform section 18 is the spring retainer bracket 30. Individual ends of the bias springs 32 extend from the bracket 30 to brackets (not shown) secured to the bottoms of the lateral frame members 136, 138. The springs 32 bias the platform section 18 to the center or neutral position whereat the platform section 18 is horizontal to the terrain. In combination, the platform springs 32 and steering springs 106 stabilize the vehicle and insure that should the operator become dislodged, the vehicle will be maintained in a straight ahead orientation, if the vehicle remains upright.

Turning attention to the longitudinal platform support axle 46, the axle 46 is approximately four feet long and mounts within the multiple hanger bearings 25, 27, 28 and 29 which depend downward from the platform section 18 and cross rail 140. Also supporting the axle 46 is the hanger bearing 143 and a sleeve bearing 162 provided at the respective aft and forward ends of the platform section 50. The axle 46 otherwise is retained to the hanger bearings via at least a pair of retainers 52 and lynch pin fasteners 54 which mount through the extreme ends of the axle 46, forward of the bearing 162 and aft of the hanger 143. Other retainers 52 can also be mounted adjacent the ends of the hanger bearings 28 and 29.

The hanger bearings 25, 27 and 29 are also adjustable along the slot 22. Specifically and with attention to FIG. 7, each hanger bearing includes a clamp plate 164 which cooperates with a bracket 166 that contains a sleeve 168 which mounts about the axle 46 and has cutouts 170. A clamp action is obtained between the plates 164 and brackets 166 with the tightening of the fasteners 112. Otherwise, the cutouts 170 facilitate lubrication of the axle at the movement points and access to the T-slot fasteners for the assembly of FIG. 3.

The above-described mounting allows the axle 46 to rotate within the various hanger bearings. Wear is thereby avoided at any point along the axle. Moreover, disassembly of the stationary and movable platform sections 50 and 18 is readily achieved upon merely withdrawing appropriate ones of the retainer pins 54 from the longitudinal axle 46. Similarly, each ski 74 is readily disassembled upon withdrawing the other retainer pins 54 that secure the axle bearings 78 to the forward live axle 56 and rear stub axles 76. The vehicle can thus be quickly disassembled into a relatively small collection of subassemblies for transport.

With further attention to FIG. 7, a cabled truss assembly 172 is mounted beneath the platform section 18 to stabilize the relatively long length of the platform section 18 from typical load stresses. Warpage or bending of the section 18 is thereby prevented, without using relatively more expensive materials, such as high load strength aluminum, titanium etc.. A pair of twisted wire cables 176 are particularly provided which longitudinally extend along the length of the platform section 18. A forward, looped end 178 of each cable is secured to a forward anchor block assembly 180 which mounts slightly aft of the forward steering assembly 60. Alternatively, the forward cable ends can mount to the spring anchor block 108 (reference FIG. 4).

The cables 176, otherwise, extend from the clamp block 180 and are spaced away from the lower surface of the platform section 18 via the spacer brackets 26 which are spaced along the length of the platform section 18. Each bracket 26 includes slots which receive the cables 176.

The aft anchor block 24 is clamp mounted to the platform section 18 immediately rearward of the stirrups 40. Individual turnbuckles 182 extend from the lower retainer plate 184 to the ends of the cables 172. The tension exerted on the cables is adjusted by properly establishing the length of the turnbuckles 182. Depending upon the mounting of the steering assembly 60, the forward and aft anchor blocks 180, 24 may also be adjusted to assure that the wire cables 176 extend the maximum possible length of the platform section 18 to obtain optimal support. If the spring anchor block 108 is used in lieu of the anchor block 180, brackets 185 can restrain forward turnbuckles 182 to the brackets 185.

Also apparent from the FIG. 7, is the detail of the sail coupler mounting bracket 20. The bracket 20 is formed to position the sail assembly 6 at an incline of approximately 35 degrees to the platform section 18. Sufficient clearance is thereby obtained to permit the mounting of the end fastener 184 of the coupler 16 beneath the bracket 20, yet above the operator platform 10. The sail assembly 6 mounting is not adversely affected, since it provides multiple axes of freedom.

Attention is lastly re-directed to the aquatic, hydrofoil assembly 8 of FIG. 3. Attention is also directed to FIG. 8 which shows an end-on elevation view in partial section through the forward section 97 of the operator platform 190. The principle distinction of the vehicle 8 over the vehicles 2 and 4 is that it provides a shaped flotation platform 190 which is supported from water skis 96. The platform is constructed of buoyant materials and is covered with an outer skin to provide sufficient strength for the application.

In lieu of a rigid internal framework and slotted channel 22, a number of T-shaped or dovetail track sections 192 are molded into the platform 190. Mating tail or slide pieces 193 which, for example, project from the sail coupler 16 and steering assembly 60 slide couple to the tracks 192 to permit longitudinal adjustment of the assemblies 16 and 60. Longitudinally extending splines 194 are laminated to the track sections 192 and extend the length of the platform to strengthen the platform 190.

Figure 8:
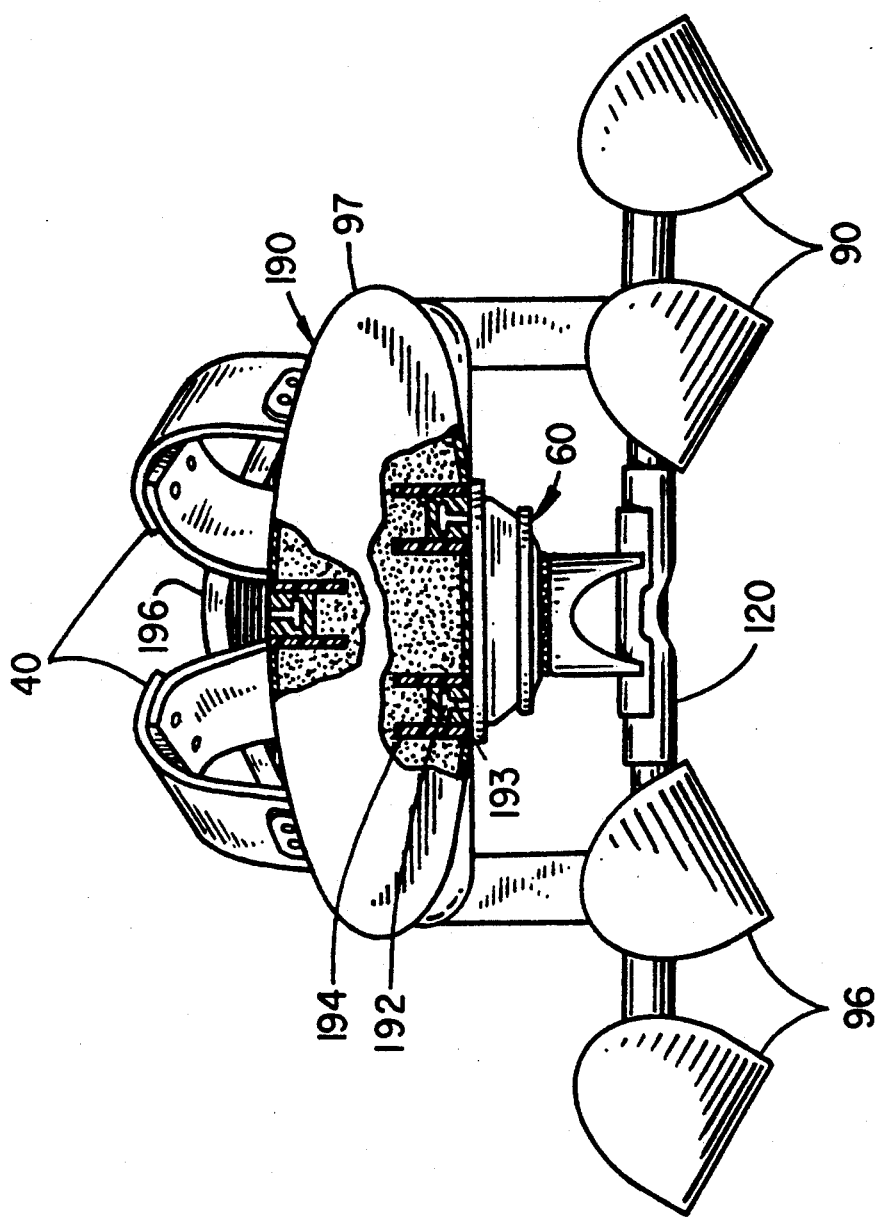
FIG. 8 is a front elevation view shown in partial cross section through the flotation platform of the vehicle of FIG. 3.

Also apparent from FIGS. 3 and 8 is that the aft platform section 196 stands at a higher profile than the forward section 97 and tapers rearward and outward. A splashguard is provided via this shaping which combined with a textured upper surface prevents foot slippage. Otherwise, the stirrups 40 are also mounted over a textured surface 198. In normal use, the platform 190 floats until the vehicle speed is sufficient to lift the assembly 8 and operator from the water and onto the skis 96.

Appreciating the foregoing, a partial flotation section (not shown) may also be appropriately included within the platform 10 of the vehicle 2. The purpose would be to provide flotation, in the event open water is encountered, such as if the vehicle 2 breaks through the ice. Under these circumstances, the flotation capability will support the vehicle 2 and operator, provided sufficient amounts of flotation material are provided. Normally, however, operators seek to avoid such conditions.

While the invention has been described with respect to its presently preferred construction and variously considered modifications and improvements thereto, it is to be appreciated that still other constructions may suggest themselves to those skilled in the art. Accordingly, it is contemplated that the following claims should be interpreted to include all those equivalent embodiments thereof.

What is claimed is:
1. A wind powered vehicle comprising:
   (a) sail means for capturing surface winds including a sail, a mast and a boom and means for manipulating said sail means by an upright operator;
   (b) an operator support platform including an aft platform section and a forward platform section, a longitudinal axle, means for coupling said sail means to said forward platform section and means for pivotally securing said longitudinal axle between the forward and aft platform section, wherein said aft platform section supports a first foot of the operator, wherein said forward platform section includes stirrup means for restraining the other foot of the operator to said forward platform section to control rotation of the forward section about the longitudinal axle;

(c) first and second terrain contacting means for supporting the platform to a terrain surface and wherein a caster angle of the first terrain contacting means is opposite to a caster angle of the second terrain contacting means;

(d) steering means coupled to said forward platform section including first and second portions and a plurality of roller bearings coupled between said first and second portions, wherein said first portion couples to the forward platform section and said second portion couples to a steering axle means containing the first terrain contacting means, and wherein the first and second portions rotate relative to one another with the rotation of the forward platform section to directionally steer the first terrain contacting means; and (e) means for securing the second terrain contacting means to the aft platform section.

2. Apparatus as set forth in claim 1 including suspension means for resiliently supporting the aft platform section relative to the second terrain contacting means.

3. Apparatus as set forth in claim 2 including:
(a) first and second arms containing respective first and second projecting stub axles and means for pivotally securing said first and second arms to the aft platform section; and
(b) wherein said suspension means comprises 1) first and second coil springs extending between said aft platform section and said first and second stub axles, 2) sway means extending between said first and second arms for restraining lateral sway of the apparatus, 3) means for limiting the compression of said first and second coil springs, and 4) first and second shock absorbing means respectfully extending between the aft platform section and said first and second arms.

4. Apparatus as set forth in claim 2 including:
(a) first and second arms containing respective first and second projecting stub axles and means for pivotally securing said first and second arms to the aft platform section; and
(b) wherein said suspension means comprises 1) torsion means coupled to the aft platform section and said first and second arms, 2) sway means extending between said first and second arms for restraining lateral sway of the apparatus, and 3) first and second shock absorbing means respectively extending between the aft platform section and said first and second arms.

5. Apparatus as set forth in claim 2 wherein said terrain contacting means each include a pair of skis, wherein an outer longitudinal edge of each ski of the first terrain contacting means contacts the terrain and wherein an inner longitudinal edge of each ski of the second terrain contacting means contacts the terrain.

6. Apparatus as set forth in claim 5 including means for adjusting the caster angle of each ski within a range from 15 to 45 degrees.

7. Apparatus as set forth in claim 6 including first and second shock absorber means extending from the caster angle adjustment means to fore and aft surfaces of each ski.

8. Apparatus as set forth in claim 6 wherein said caster angle adjustment means comprises a base support secured to the ski surface, means for coupling to one of said axles, and means including a pivot whereabout the axle coupling means rotates and means for selectively fixing the caster angle of the axle coupling means.

9. Apparatus as set forth in claim 1 wherein said first and second terrain contacting means each include a pair of terrain contacting support members and means for selectively adjusting the caster angle of each support member.

10. Apparatus as set forth in claim 9 wherein the terrain contacting support members comprise skis.

11. Apparatus as set forth in claim 9 wherein the terrain contacting support members comprise wheels.

12. Apparatus as set forth in claim 1 including means for biasing said steering means to a predetermined neutral position.

13. Apparatus as set forth in claim 1 including means for biasing the forward platform section to a predetermined neutral position.

14. Apparatus as set forth in claim 1 wherein said sail coupler means projects at an inclined angle from the platform to receive a mating coupler portion appended to the mast.

15. Apparatus as set forth in claim 1 including track means for selectively longitudinally adjusting the mounting position of said sail means and steering means along the length of said forward platform section.

16. Apparatus as set forth in claim 15 including a plurality of tubular members secured to said track means and receiving the longitudinal axle within bores thereof and means for securing the longitudinal axle to rotate freely within said tubular members.

17. Apparatus as set forth in claim 1 including means having a length adjustable cable for stabilizing the forward platform section.

18. Apparatus as set forth in claim 1 wherein said platform is configured to float on water.

19. Apparatus as set forth in claim 1 wherein said platform includes a plurality of roughened surface areas means for facilitating an operator foothold with the platform.

20. A wind powered vehicle comprising:
(a) sail means for capturing surface winds including a sail, a mast, a boom and means for manipulating the sail means by an upright operator;
(b) an operator support platform including a first platform section and a second platform section, a longitudinal axle, means for coupling said sail means to one of said first and second platform sections and means for pivotally securing said longitudinal axle to said first and second platform section, wherein each of said first and second platform sections supports a foot of the operator such that operator foot movement controls rotation of one of said first and second platform sections relative to the other about the longitudinal axle;
(c) first and second terrain contacting means for supporting the platform to a terrain surface, wherein one of said first and second terrain contacting means includes a pair of terrain contacting support members and means for independently adjusting a caster angle of each support member;
(d) steering means coupled to the rotating one of said first and second platform sections including first and second portions and a plurality of roller bearings coupled between said first and second portions, wherein said first portion is coupled to the rotating one of said first and second platform sections and said second portion is coupled to a steering axle means containing one of said first and second terrain contacting means, and wherein the first and second portions rotate relative to one another with the rotation of the rotating one of said first and second sections for directionally steering the vehicle; and (e) means for securing the other of said first and second terrain contacting means to the other of said first and second platform sections.

* * * * *